(12) United States Patent
Lind et al.

(10) Patent No.: US 8,234,628 B2
(45) Date of Patent: *Jul. 31, 2012

(54) LAYERED ARCHITECTURE FOR MOBILE TERMINALS

(75) Inventors: Jan Lind, Bjärred (SE); Stefan Runeson, Lund (SE); Sebastian Weber, Malmö (SE); Rikard Dahlman, Malmö (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 412 days.

This patent is subject to a terminal disclaimer.

(21) Appl. No.: 12/355,540

(22) Filed: Jan. 16, 2009

(65) Prior Publication Data

US 2009/0178027 A1   Jul. 9, 2009

Related U.S. Application Data

(62) Division of application No. 10/359,911, filed on Feb. 7, 2003, now Pat. No. 8,079,015.

(51) Int. Cl.
*G06F 9/44* (2006.01)
(52) U.S. Cl. ......... 717/120; 717/121; 361/788; 361/785
(58) Field of Classification Search ........................ None
See application file for complete search history.

(56) References Cited

U.S. PATENT DOCUMENTS

| 6,137,802 A | 10/2000 | Jones et al. |
| 2003/0177275 A1 | 9/2003 | Lind et al. |

FOREIGN PATENT DOCUMENTS

| EP | 0 841 612 A2 | 5/1998 |
| JP | H10-301783 | 11/1998 |
| JP | 2001-111384 | 4/2001 |
| KR | 2001/056289 A | 7/2001 |
| WO | WO 00/59249 | 5/2000 |

OTHER PUBLICATIONS

Garlan, et al. "An Introduction to Software Architecture", Jan. 1994, School of Computer Science, Carnegie Mellon University, Pittsburgh, PA 15213-3890.

*Primary Examiner* — Olumide T Ajibade Akonai
*Assistant Examiner* — Randy Peaches (57) ABSTRACT

Software architecture for a mobile terminal for a wireless telecommunications system and for other applications. The software architecture includes a plurality of layers arranged in order from layers providing higher level services to layers providing lower level services, at least one software module in each layer, and interface means for permitting communication among software modules pursuant to a set of defined dependency rules.

4 Claims, 6 Drawing Sheets

LAYERED ARCHITECTURE FOR MOBILE TERMINALS

CROSS-REFERENCE TO RELATED APPLICATIONS

This application is a divisional of U.S. patent application Ser. No. 10/359,911 filed on Feb. 7, 2003 now U.S. Pat. No. 8,079,015.

BACKGROUND OF THE INVENTION

1. Technical Field of the Invention

The present invention relates generally to the field of wireless telecommunications; and, more particularly, to a software architecture for a mobile terminal for a wireless telecommunications system.

2. Description of Related Art

Since cellular telecommunications systems were first introduced in the 1980s, mobile terminals (Mobile Stations) utilized in the systems have become increasingly more complex. Initially, mobile terminals were designed primarily to provide voice telephony services; i.e., to receive and transmit voice communications. In later years, mobile terminals were developed that also included the ability to transfer user data not related to that of a voice telephone call. Such user data included, for example, data to be transferred over a dial-up networking connection initiated via a personal computer (PC). Currently, so-called "third generation" (3G) systems are being developed for future cellular telecommunications systems. 3G systems will combine high-speed Internet access with traditional voice communication, and will provide a user with access to Internet browsing, streaming audio/video, positioning, video conferencing and many other capabilities in addition to voice communication.

The Third Generation Partnership Project (3GPP) was established to ensure compatibility among the several 3G systems that are being developed around the world. The Universal Mobile Telephone System (UMTS) is being developed by 3GPP to provide a 3G system that includes terrestrial and satellite systems capable of delivering voice, data and multimedia anywhere in the world.

The drastically increased functionality that is being included in cellular telecommunications systems via the 3GPP standardization has placed substantial demands on the developers of mobile terminals to be used in the systems. This demand is exacerbated by the fact that a mobile terminal is a "resource scarce" environment that is limited in size, memory and power.

Traditionally, mobile terminal manufacturers have designed, fabricated and marketed substantially complete mobile terminal systems that include all the hardware and software needed for basic terminal operation as well as the hardware and software needed to provide the features and capabilities desired by the manufacturer or a particular user based on their perception of market needs. Such an approach does not provide the flexibility to quickly adapt to rapid changes in market demands or to satisfy the diverse requirements of multiple users.

Furthermore, the software incorporated in a mobile terminal is typically organized in an architecture that comprises a number of software modules that communicate with one another by calling each other's exported interfaces. A problem with such architecture is that there are no specific rules that separate clients from servers, and this makes it difficult to "visualize" the manner in which the software is organized. As a result, current architectural schemes can result in a mixing of client and server functionality in each module on the same level; and such mixing can cause severe problems in the configuration, development and maintenance of the software.

There is, accordingly, a need for a software architecture for a mobile terminal for a wireless telecommunications system and for other applications that is organized in such a manner that the software thereof can be easily visualized and understood.

SUMMARY OF THE INVENTION

The present invention provides a software architecture for a mobile terminal for a wireless telecommunications system and for other applications that is organized in a logical manner such that the software thereof can be easily visualized and understood.

A software architecture according to the present invention comprises software organized in a plurality of software layers arranged in order from software layers providing higher level services to software layers providing lower level services. Each software layer includes at least one software module. The software architecture further includes interface means for permitting communication among software modules in said plurality of software layers pursuant to a set of defined dependency rules.

The present invention recognizes that by organizing software in a plurality of software layers arranged in order from software layers providing higher level services to software layers providing lower level services, and by defining a set of dependency rules by which software modules in the plurality of layers can communicate, it becomes easier to visualize and understand the dependencies in the software architecture. This, in turn, makes it easier to configure, develop and maintain the software; as well as to update or otherwise modify the software.

Further advantages and specific details of the present invention will become apparent hereinafter from the detailed description given below in conjunction with the following drawings.

DETAILED DESCRIPTION OF THE EXEMPLARY EMBODIMENTS OF THE INVENTION

Figure 1:
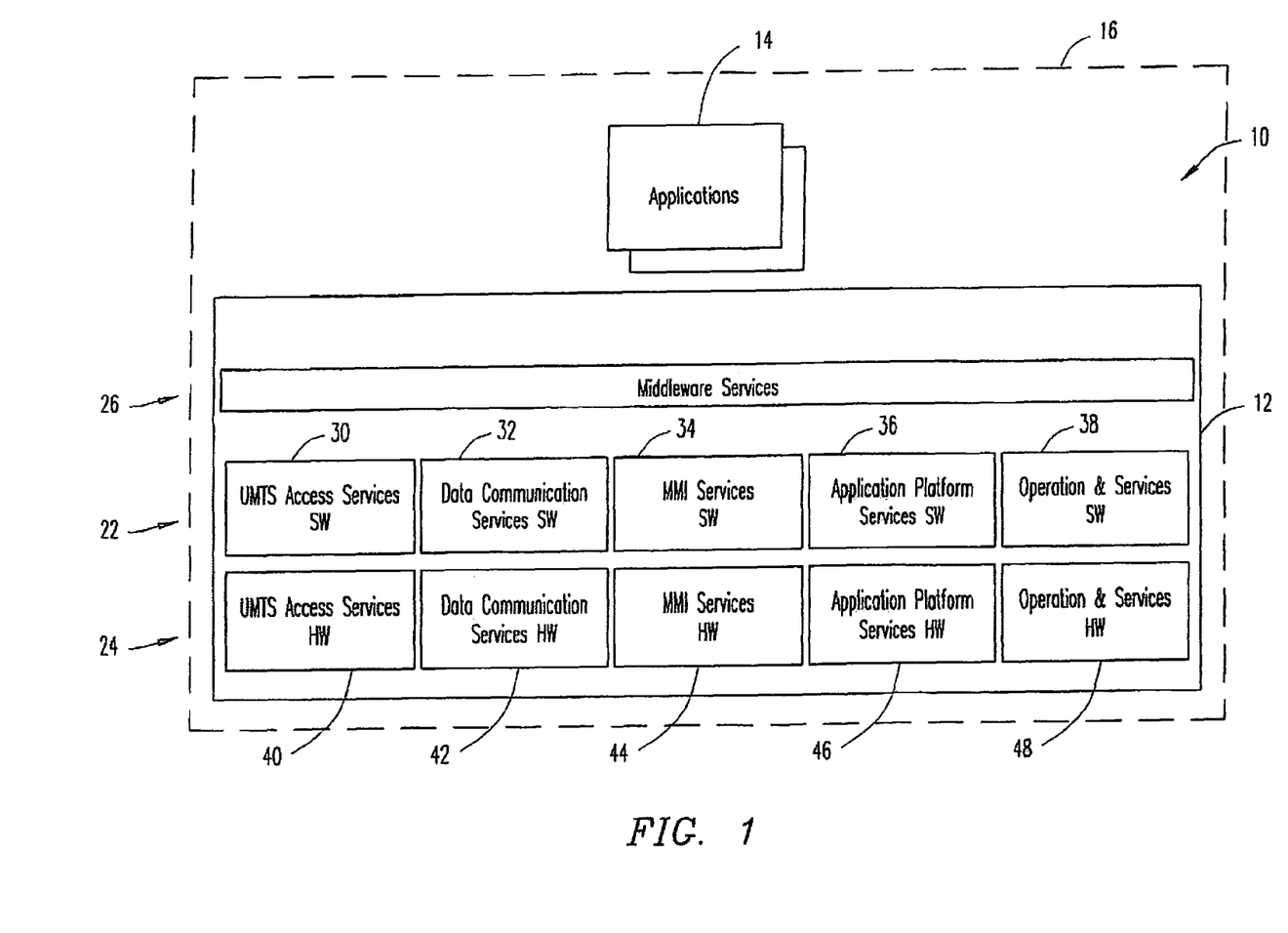
FIG. 1 is a block diagram that schematically illustrates a platform system for a mobile terminal for a wireless telecommunications system to assist in explaining the present invention.

FIG. 1 is a block diagram that schematically illustrates a platform system for a mobile terminal for a wireless telecommunications system to assist in explaining the present invention. The platform system is generally designated by reference number 10 and comprises a mobile terminal platform assembly 12 and one or more applications (i.e., application software) 14 that have been loaded, installed and run in the mobile terminal platform assembly (the term "loaded" as used herein is intended to include any mechanism by which the application software can be combined with the software of the mobile terminal platform assembly via the interface including, for example, downloading from the Internet or installing a hardware chip). Platform system 10 is adapted to be incorporated in a mobile terminal generally designated by dotted line 16. Mobile terminal platform assembly 12 includes a software services component 22, a hardware component 24 and an interface component 26. Software services component 22 generally comprises a plurality of well-structured functional software units for providing services that are offered to users via the interface component 26. In the platform system of FIG. 1, the plurality of software units comprises a plurality of vertically-oriented functional software stacks including a UMTS access services software stack 30, a data communications services software stack 32 (which will be described more fully hereinafter), an MMI (Man-Machine Interface) services software stack 34, an application platform services software stack 36 and an operation and services software stack 38.

The hardware component 24 comprises a set of hardware units that are associated with and controlled by their respective functional software stacks. In the platform system illustrated in FIG. 1, the hardware units include UMTS access services hardware 40, data communications services hardware 42, MMI services hardware 44, application platform services hardware 46 and operation and services hardware 48. Interface component 26 comprises a middleware services layer that includes one or more application interface (API) options for development of specific applications. These APIs may include standardized (non-native) interfaces, de facto standardized interfaces and/or open native interfaces. For example, a standardized interface might include the J2MB (JAVA 2 Micro Edition) environment according to MIDP/CLDC (Mobile Information Device Profile/Connected Limited Device Configuration). The middleware services layer also functions to isolate assembly 12 from applications via the one or more interfaces, and may provide other services as will be described hereinafter.

Mobile terminal platform assembly 12 of platform system 10 is adapted to be designed, implemented (assembled) and tested as a complete, enclosed unit separate from the application software 14 (the term "application software" as used herein can be any software that provides the functionality that users may wish to have available). Users (the term "users" as used herein includes manufacturers, end users and other customers and users) can, accordingly, develop or otherwise acquire their own application software and add that software to the mobile terminal platform assembly 12 at a later time in order to complete the platform system 10. Mobile terminal platform assembly 12 can, accordingly, be sold or otherwise transferred to a plurality of different users each of which can complete platform system 10 by loading, installing and running their own application software in the assembly in order to satisfy their own particular requirements for the platform system.

Software stacks 30-38 of software services component 22 and their associated hardware units 40-48 define functional stacks that are structured into manageable pieces (software modules and hardware blocks) having clearly defined functionality and interfaces. A user of mobile terminal platform assembly 12 does not have to be concerned about the internal details of the functional stacks, but can access the stacks via the middleware services layer 26 to obtain the functionality required to design application software.

Figure 2:
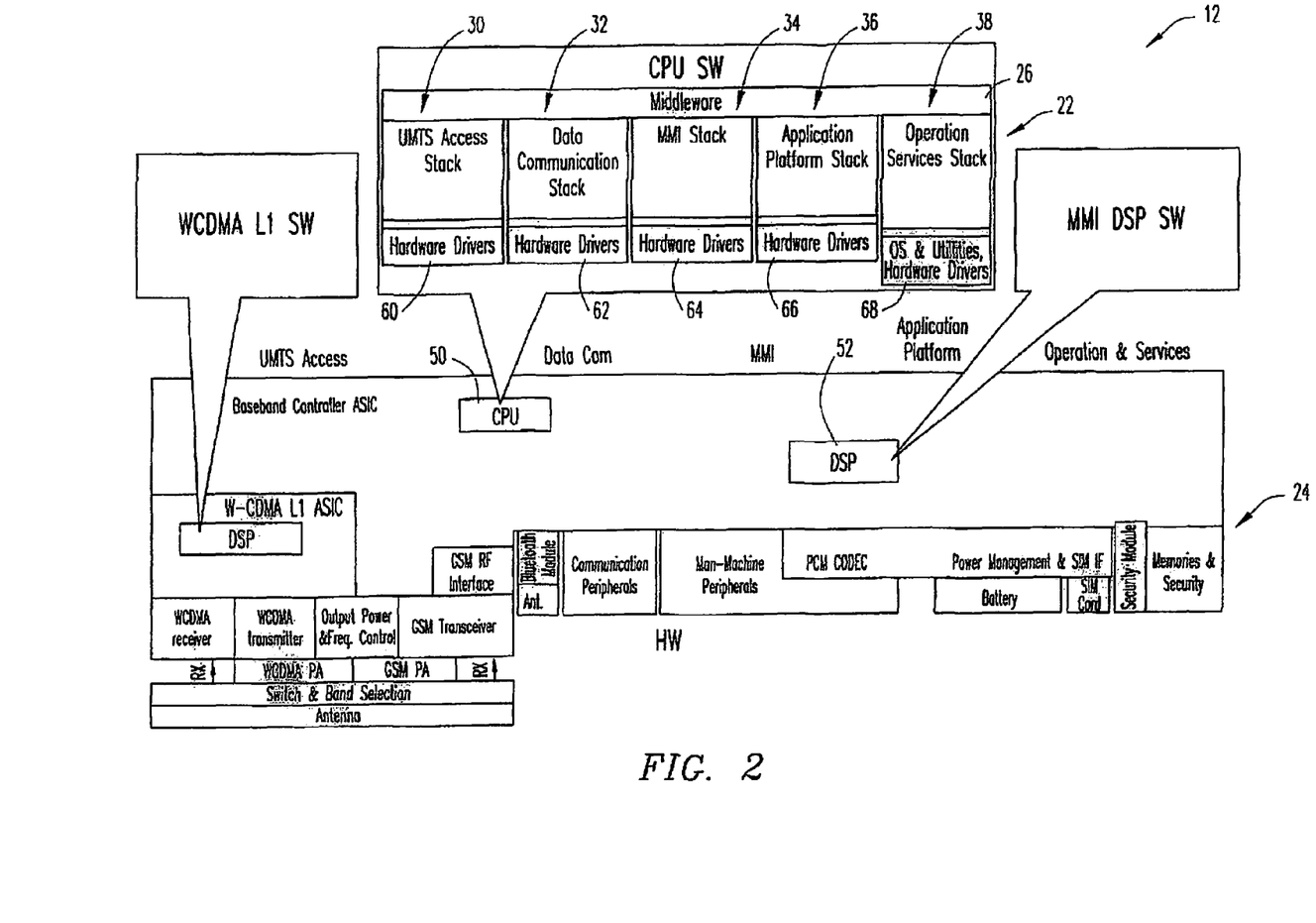
FIG. 2 is a block diagram that schematically illustrates a deployment view of the mobile terminal platform assembly of the platform system of FIG. 1 to further assist in explaining the present invention.

FIG. 2 is a block diagram that schematically illustrates a deployment view of mobile terminal platform assembly 12 of FIG. 1 to further assist in explaining the present invention. As illustrated, mobile terminal platform assembly 12 is controlled via software executing in a main CPU 50. The main CPU may comprise one or more processors such as microprocessors, micro programmable processors or DSPs (Digital Signal Processors). A DSP for the MMI services software stack 34 is illustrated at 52. The software stacks 30-38 of software component 22 each include hardware driver software 60-68 to operate the hardware units associated with each stack. As shown in FIG. 2, exemplary of the hardware units that are controlled by the functional software stacks include a receiver, a transmitter, a power and frequency controller, a GSM transceiver, a Bluetooth module, various communication and man-machine peripherals, power management and SIM interface, memories and security hardware.

The software incorporated in a mobile terminal is typically organized in an architecture that comprises a number of software modules that communicate with one another by calling each other's exported interfaces. A problem with such an architecture is that there are no specific rules that separate clients from servers, and this makes it difficult to "visualize" the manner in which the software is organized. As a result, current architectural schemes can result in a mixing of client and server functionality in each module on the same level; and such mixing makes it very difficult to configure, develop and maintain the software.

The present invention provides a software architecture in which the software is organized in a logical manner and is permitted to communicate pursuant to a set of defined dependency rules so that the software can be easily visualized and understood.

Figure 3:
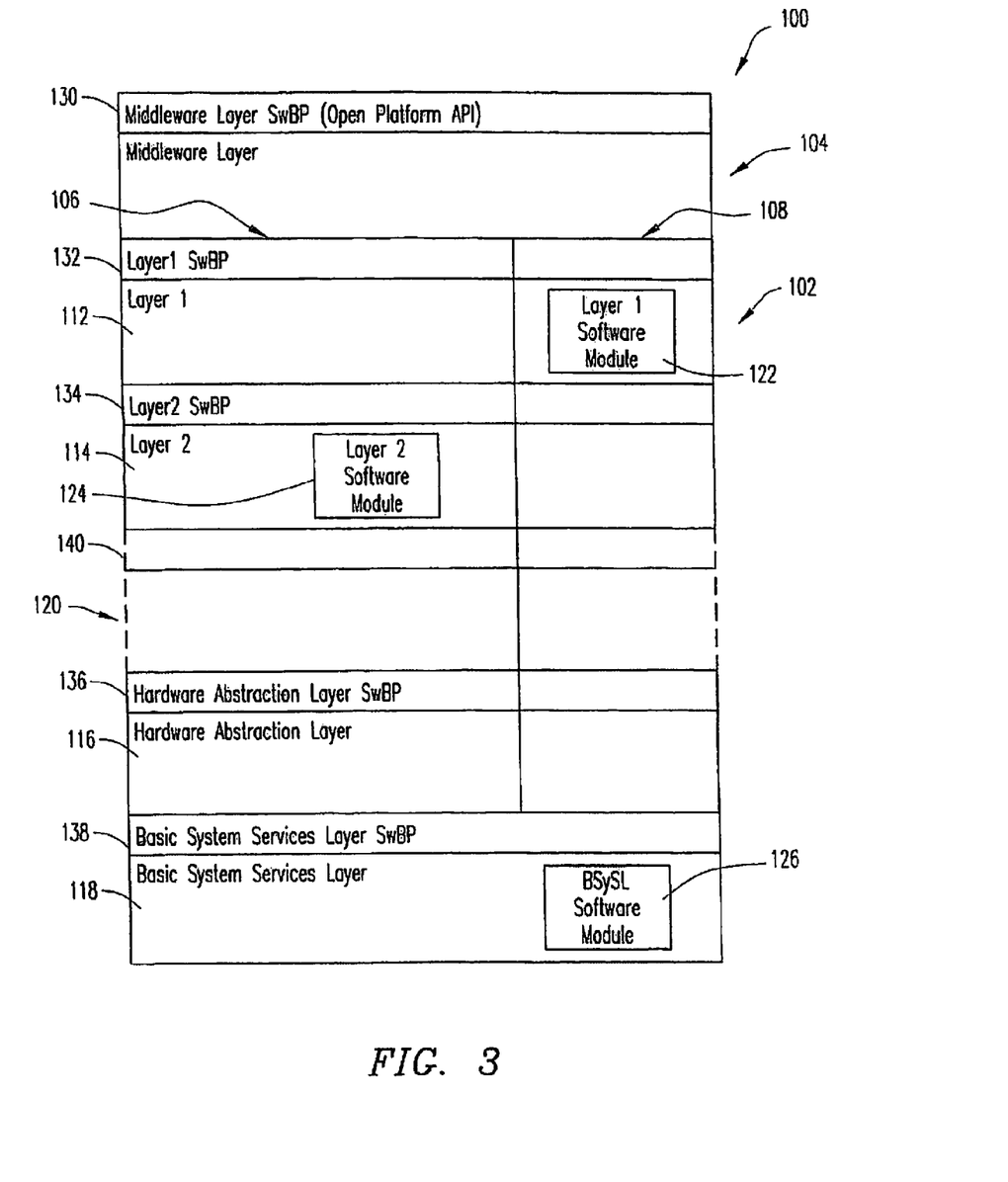
FIG. 3 is a block diagram that schematically illustrates a software architecture according to an exemplary embodiment of the present invention.

FIG. 3 is a block diagram that schematically illustrates a software architecture according to an exemplary embodiment of the present invention. The software architecture is generally designated by reference number 100; and, in the exemplary embodiment shown in FIG. 3, comprises the software of a software services component 102 and the software of a middleware services layer 104 of a mobile terminal platform assembly. As shown in FIG. 3, in addition to being organized into a plurality of vertical, functional software stacks as described with reference to FIGS. 1 and 2 (two functional software stacks 106 and 108 are illustrated in FIG. 3), the software services component 102 is also arranged to define a plurality of horizontal software layers such that the software of the middleware services layer 104 and the software of the software services component 102 together define layered software architecture 100.

The software architecture according to exemplary embodiments of the present invention differ from the standard ISO/OSI (ISO Open Systems Interconnection) model in that it includes a plurality of horizontally partitioned functional software units that complement a plurality of vertically partitioned software layers. The horizontal partitioning contributes significantly to the creation of independent modular (service) components.

In software architecture 100, the plurality of horizontal software layers are arranged in descending order from a higher level software services layer to a lower level software services layer. The highest layer is the middleware services layer 104 which, as described above, provides one or more interfaces to the mobile terminal platform assembly and also isolates the platform assembly from the applications using it. Middleware services layer 104 may also provide other environmental services for the applications as will be described hereinafter.

Software services component 102 includes one or more software layers to provide various services for applications. The number of layers provided depends on the services that are to be provided, and software services component 102 can comprise any desired number of layers. In the exemplary embodiment of FIG. 3, layers 112, 114, 116 and 118 are specifically illustrated, and the capability of including additional layers is schematically illustrated in dotted line at 120.

The next to lowest layer 116 of software services component 102 (and, hence, of software architecture 100) comprises a Hardware Abstraction Layer (HAL), and the lowest layer 118 of software services component comprises a Basic System Services Layer (BSySL). The Basic System Services Layer contains services that are needed by all modules of the mobile terminal platform assembly, and the Hardware Abstraction Layer encapsulates the hardware dependencies. The software of software architecture 100 is organized into a plurality of software modules, e.g., modules 122, 124 and 126. Each software layer of the software architecture can contain from one to a large number of software modules, however, all the software modules in any particular layer and in any particular vertical functional stack will have the same level of abstraction. In addition, a single software module can reside in only one vertical functional stack, and in only one horizontal layer within that stack.

The various modules in each layer implement the interfaces per function category to the layer. These interfaces are gathered together in a Software Back Plane (SwBP) for each layer which are separated from the module implementation. In particular, there is no hard coupling between the software modules and the interfaces in the SwBP; and this permits any particular software module and/or any implementation of the interfaces to be freely changed without any impact on the clients to the interfaces. In FIG. 3, the SwBP for software layers 104,112, 114, 116 and 118 are designated by reference numbers 130,132, 134, 136 and 138, respectively; and the SwBPs for the possible additional layers 120 (shown in dotted line) is designated by reference number 140.

Figure 4:
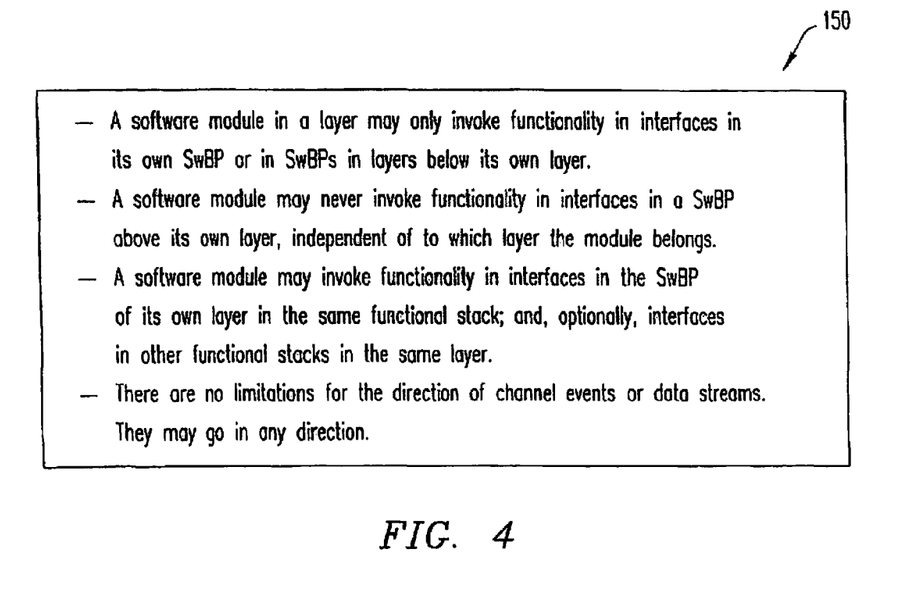
FIG. 4 is a chart that illustrates a set of dependency rules by which software modules of the software architecture of FIG. 3 may communicate according to another exemplary embodiment of the present invention.

The various software modules in the various software layers of software architecture 100 are permitted to communicate pursuant to a set of defined dependency rules. In accordance with an exemplary embodiment of the present invention, and as illustrated in the chart 150 of FIG. 4, the dependency rules are as follows:

A software module in a layer may only invoke functionality in interfaces in its Own SwBP or in SwBPs in layers below its own layer.

A software module may never invoke functionality in interfaces in a SwBP above its own layer, independent of to which layer the module belongs.

A software module may invoke functionality in interfaces in the SwBP of its own layer in the same functional stack.

There are no limitations for the direction of channel events or data streams. They may go in any direction.

In an alternative embodiment of the present invention, an additional dependency rule might be provided to permit a software module to invoke functionality in another software module in the same layer in a different functional stack. This additional rule may be desirable in certain embodiments to limit the number of layers in the functional stacks.

In accordance with the above dependency rules, hard dependencies between software layers are always downward in the software architecture. Communication upward through the layers is handled by events; however, to receive an event, a module must have a subscription. Therefore, there are no hard dependencies between the event detector in a lower layer (sending the event) and the event user in the higher layer (receiving the event). Therefore, the independence of lower layers from higher layers is preserved.

By organizing the software of the mobile terminal platform assembly into a plurality of layers, and by defining a set of dependency rules by which software modules in the various layers may communicate, a software architecture is provided in which the dependencies in the software can be easily visualized and understood. This provides a number of advantages. For example, the horizontal software layers combined with the defined dependency rules forces a developer to do a client-server design, which is important when configuring the software. It is also easier to configure the software in abstraction levels as upper layers can be removed without affecting lower layers.

The software layers combined with the defined dependency rules and the horizontal functional stacks makes it easier to configure the software in functionality, as the stacks are sorted by functionality and any particular stack can be removed without having any impact on the internals of other functional stacks.

The separation of the layer interface (the SWBP) from the layer implementation (modules), simplifies the exchange of module implementations and designs inside a layer as the modules are encapsulated by the SWBP. This also simplifies version handling as changes in a module implementation will not have any effect on the SWBP as long as the interface is unchanged.

Figure 5:
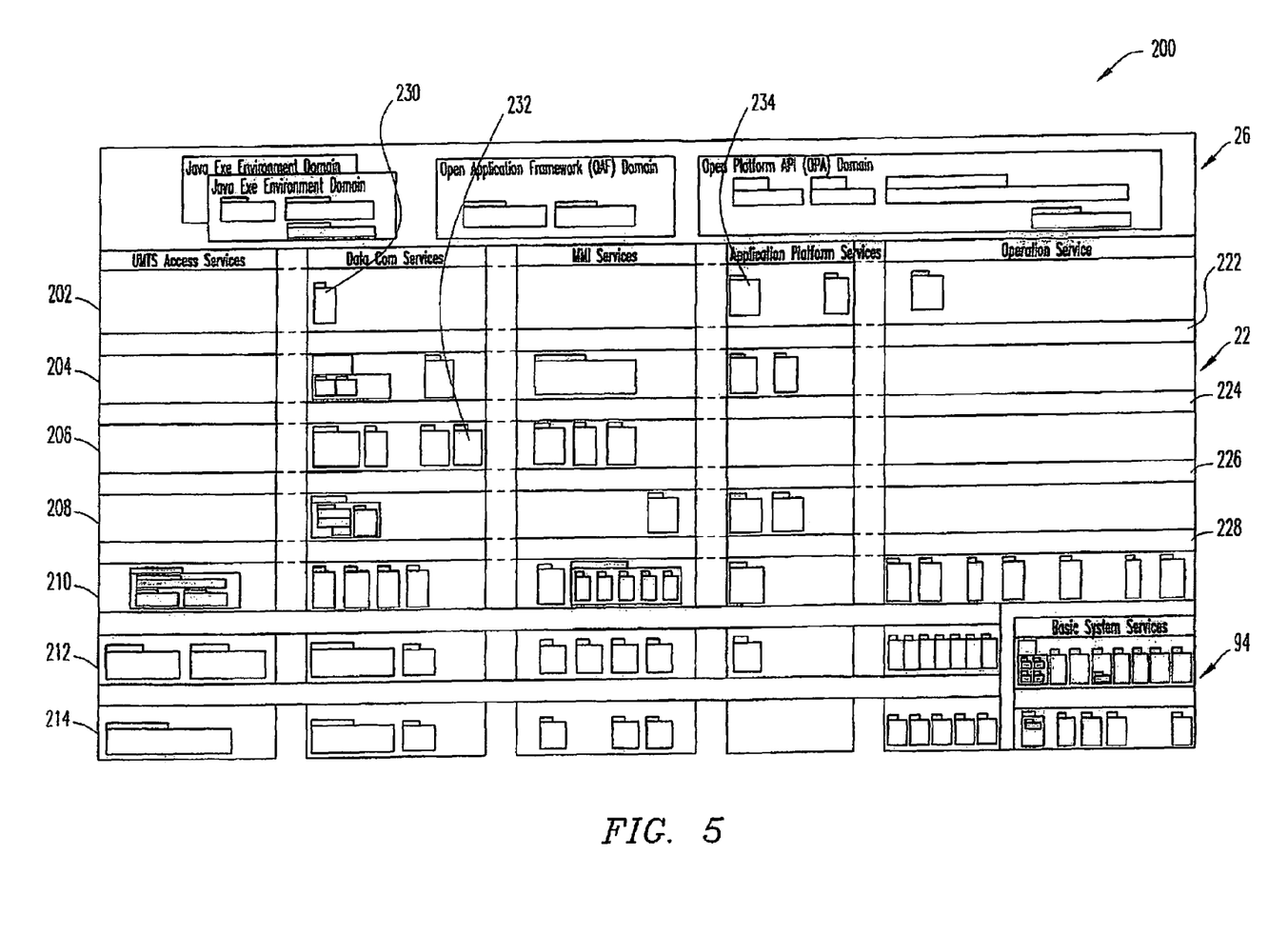
FIG. 5 is a block diagram that schematically illustrates a specific implementation of a software architecture for the mobile terminal platform assembly of FIGS. 1 and 2 according to another exemplary embodiment of the present invention.

FIG. 5 is a block diagram that schematically illustrates a specific implementation of the software architecture for the mobile terminal platform assembly 12 of FIGS. 1 and 2 according to another exemplary embodiment of the present invention. In FIG. 5, the software architecture is designated by reference number 200, and comprises a plurality of layers including the middleware services layer 26 and layers of the software services component 22. Each layer includes at least one module, such as modules 230, 232 and 234.

The layers of software services component 22 include an application server layer 202 to provide application services, a platform services layer 204 to provide platform specific services for applications, a platform protocol layer 206 to provide session protocols and application specific protocols, a transport layer 208 to provide audio access/control, datacom transport protocols and messaging transport protocols, a data access layer 210, to provide external data IF access, structured storage services and other low level platform support services, a logical drivers layer 212 and a physical drivers layer 214.

The logical drivers layer 212 constitutes a Hardware Abstraction Layer which isolates the dependencies between the hardware and software of the mobile terminal platform assembly. Only the physical drivers layer is concerned with the details of the hardware (i.e., which registers in the ASIC hardware are addressed). The logical drivers layer 212 provides a logical mapping to the hardware, i.e., this layer provides a bridge between the hardware and software parts of the mobile terminal platform assembly.

The middleware services layer 26 provides and supports a range of different application environments for development of applications. Each application environment has its own characteristics and is defined as:

The way applications are developed (programming language support, compilation and linkage).
The way applications are executed (e.g., interpretation or native code execution)
The functional services that are offered.
Potential restrictions in use.

By providing multiple application environment alternatives, a wide range of products with varying demands such as cost, ease of use, time to market, functionality set, size, portability, etc. is facilitated. As shown in FIG. 5, such environments offered by the middleware layer may include a JAVA EXE environment domain, an Open Application Framework (OAF) domain and an open platform API (OPA) domain.

As shown in FIG. 5, communication among the various modules of the various layers is accomplished via Software Back Planes such as SWBPs 222, 224, 226 and 228. As indicated previously, the software services component 22 of the mobile terminal platform assembly includes a data communications services software stack 32 According to an exemplary embodiment of the present invention, data communications services software stack 32 provides various data communications services, and supports various protocols including Internet Protocols (IPs), telecommunication device control protocols, dial-up networking and link handling protocols and external interface multiplexing protocols in order to provide such services. Among the numerous services provided by the data communications services software stack include services relating to connecting the mobile terminal to a PC (for example, for object exchange such as object exchange via Bluetooth, IrDA, USB and the like), services relating to connecting a PC to the Internet via the mobile terminal (for example, for dial-up networking), services relating to connecting the mobile terminal to the Internet (for example, for WAP, E-Mail, streaming multimedia and Internet file downloading), and services relating to connecting a mobile terminal to another mobile terminal (for example, for videoconferencing and other purposes).

Figure 6:
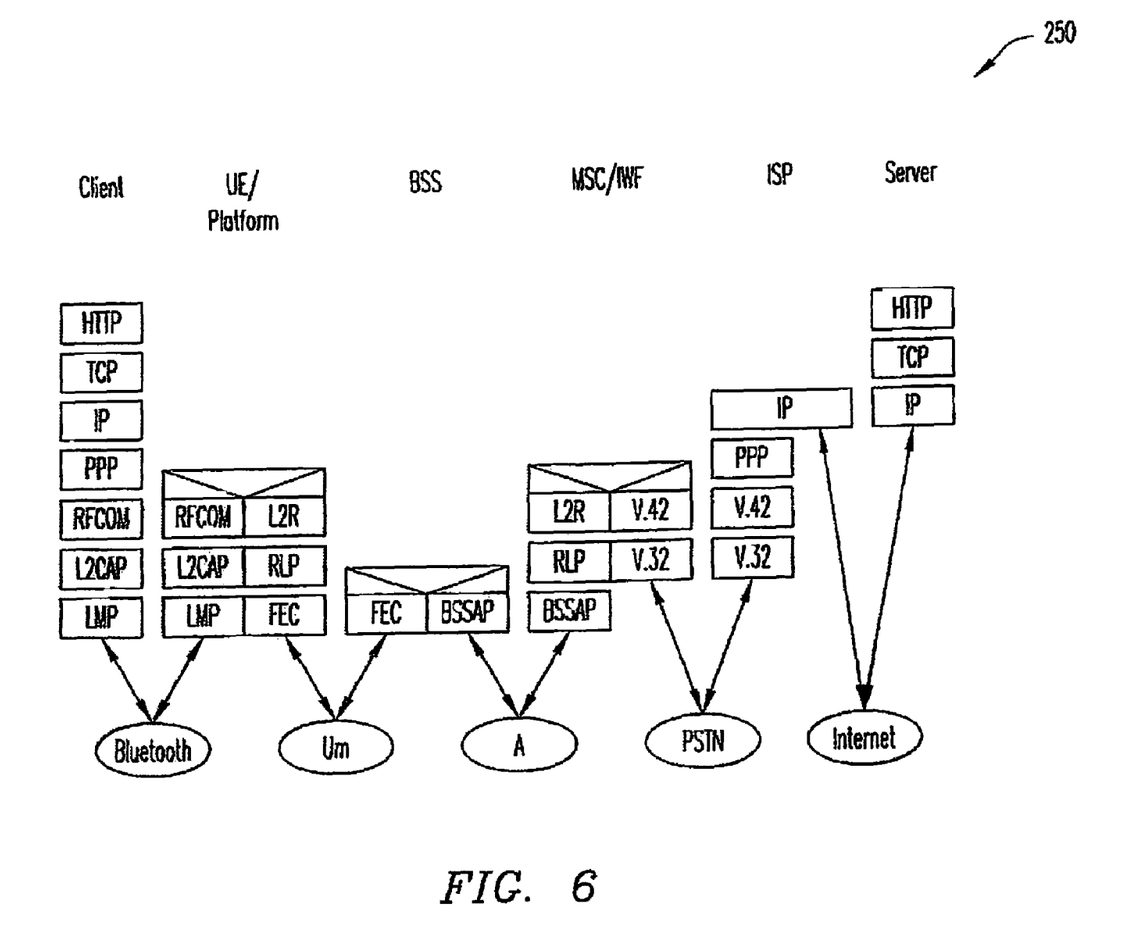
FIG. 6 is a block diagram that schematically illustrates one example of a protocol mapping, specifically, of a protocol mapping for dial-up networking via Bluetooth over GSM circuit switched data according to an exemplary embodiment of the invention.

FIG. 6 is a block diagram that schematically illustrates one example of a protocol mapping, specifically, of a protocol mapping 250 for dial-up networking via Bluetooth over GSM circuit switched data according to an exemplary embodiment of the invention. For GSM circuit switched data, the mobile terminal uses the Radio Link Protocol (RLP) over the air interface. RLP guarantees error-free transmission of data by a retransmission mechanism. RLP makes use of Forward Error Correction (FEC) to handle bit errors during transmission. Layer 2 Relay Character Oriented Protocol (L2RCOP) is used on top of RLP and implements V42bis.

Data communications services software stack 32 serves to connect the various modules in the software architecture of the mobile terminal platform assembly to the outside world. It provides a roadmap by which modules can be easily identified. For example, if there is a change in some standard, the particular module or modules affected by the standard change can be readily identified so that they can also be changed.

Figure 7:
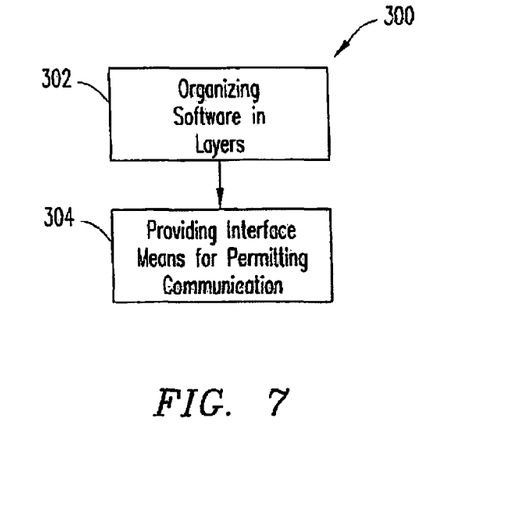
FIG. 7 is a flow chart that schematically illustrates steps of a method for constructing a software architecture according to another exemplary embodiment of the present invention.

FIG. 7 is a flow chart that schematically illustrates steps of a method for constructing a software architecture according to another exemplary embodiment of the present invention. The method is generally designated by reference number 300, and includes the step of organizing software in a plurality of software layers arranged in order from software layers providing higher level services to software layers providing lower level services (step 302). Preferably, the organizing step also includes organizing the software in at least one vertical functional software stack. The method further includes the step of providing interface means for permitting communication among the plurality of software layers pursuant to a set of defined dependency rules (step 304).

While what has been described constitutes exemplary embodiments of the present invention, it should be recognized that the invention can be varied in many ways without departing therefrom. For example, although the software architecture according to the present invention has been described as comprising a plurality of horizontal layers with one or more modules in each layer, it should be understood that a particular module may, in itself, comprise a plurality of sub-modules arranged in a plurality of layers. Also, the number and nature of the horizontal functional stacks can be varied as desired or needed for a particular application. Furthermore, although the software architecture has been described herein primarily for use in a mobile terminal for a third generation cellular telecommunications system, the architecture can also be utilized for second generation and other cellular telecommunications systems, in other wireless telecommunications systems, such as a Bluetooth system, and in other applications. In general, the software architecture of the present invention is particularly suitable when developing complex software systems.

Because the invention can be varied in numerous ways, it should be understood that the invention should be limited only insofar as is required by the scope of the following claims.

What is claimed:

1. A method for organizing a software architecture in a mobile terminal, comprising:
  organizing software in a plurality of software layers arranged in order from software layers providing higher level services to software layers providing lower level services, each software layer including at least one software module; and
  providing an interface means for permitting communication among software modules in said plurality of software layers pursuant to a set of defined dependency rules wherein the interface means comprises a Software Back Plane for each software layer, each Software Back Plane having interfaces with the at least one software module in its respective software layer, and wherein the set of defined dependency rules includes a rule that a software module in a software layer may only invoke functionality in an interface in its own Software Back Plane or in Software Back Planes of software layers below its own Software Back Plane, and a rule that a software module may never invoke functionality in an interface in a Software Back Plane of a software layer above its own software layer.

2. The method according to claim 1, wherein said organizing further organizes said software in at least one vertical functional software stack.

3. The method according to claim 2, wherein said set of defined dependency rules further includes a rule that a software module in a software layer may invoke functionality in an interface in the Software Back Plane of its own software layer and in the same functional software stack.

4. The method according to claim 2, wherein said set of defined rules further includes a rule that a software module in a software layer may invoke functionality in an interface in the Software Back Plane of its own software layer and in a different functional software stack.

* * * * *